(No Model.)
W. J. FAUL.
LUBRICATOR FOR LOOSE PULLEYS.
No. 410,406. Patented Sept. 3, 1889.
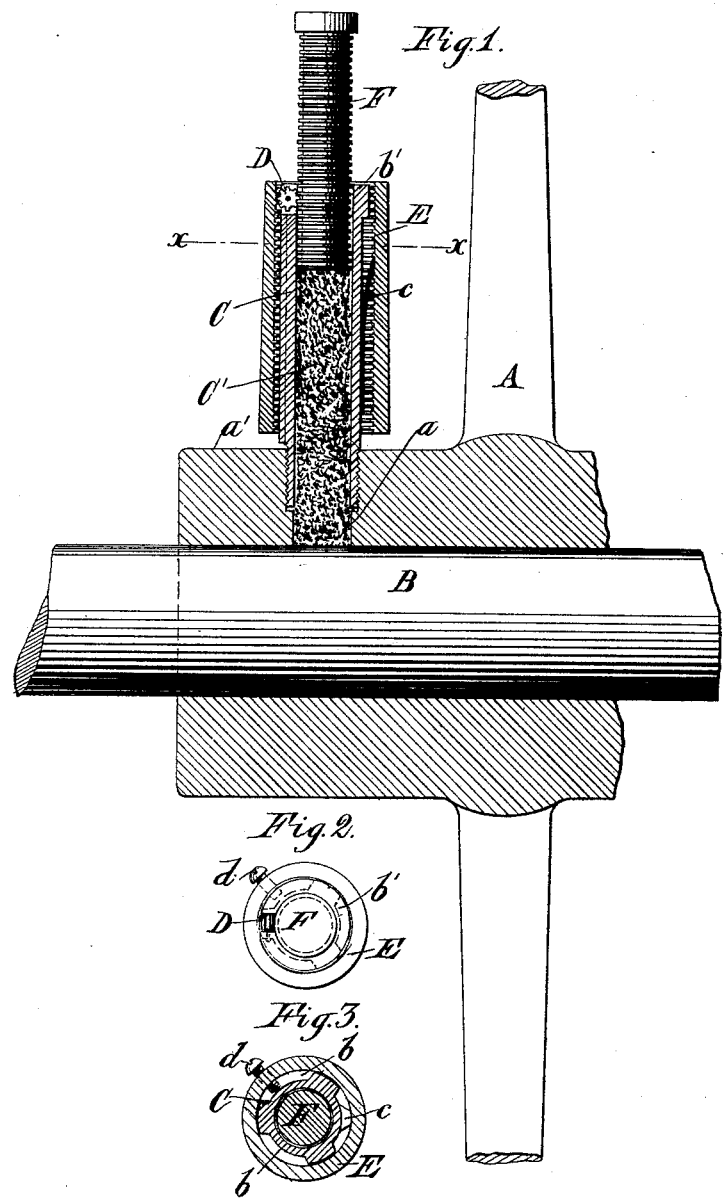

UNITED STATES PATENT OFFICE.

WILLIAM J. FAUL, OF BROOKLYN, NEW YORK.

LUBRICATOR FOR LOOSE PULLEYS.

SPECIFICATION forming part of Letters Patent No. 410,406, dated September 3, 1889.

Application filed March 14, 1889. Serial No. 303,209. (No model.)

*To all whom it may concern:*

Be it known that I, WILLIAM J. FAUL, of Brooklyn, in the county of Kings and State of New York, have invented a certain new and useful Improvement in Lubricators for Loose Pulleys, of which the following is a specification.

My improvement relates to that class of lubricators which are secured upon the hub of a loose pulley and wherein is contained a stick of lubricating material, which lubricating material is caused to be pressed against the shaft upon which the pulley is mounted in order to lubricate the bearing. In the present example the stick or body of lubricating material is caused to be held in constant contact with the shaft through the action of centrifugal force.

I will describe in detail a lubricator embodying my improvement, and then point out the novel features in claims.

In the accompanying drawings, Figure 1 is a vertical section illustrating a lubricator embodying my improvement, a portion of a pulley upon which the same is mounted, and a portion of a shaft. Fig. 2 is an end view of the lubricator. Fig. 3 is a transverse section taken on the line *x x*, Fig. 1.

Similar letters of reference designate corresponding parts in all the figures.

A designates a pulley, and B a shaft upon which the same is mounted. The pulley rotates upon the shaft.

C designates a case for containing a stick of lubricating material C'. This lubricating material is preferably hard, so that it will not melt, but will be worn off by its frictional contact with the shaft B. The case C is shown as tubular and as screw-threaded at its inner end to engage a tapped hole *a* in the hub *a'* of the pulley. The hole *a* extends wholly through the hub of the pulley, so that the stick of grease may extend at its inner end into direct contact with the shaft B. I have shown the outer surface of the case C as provided with longitudinally-extending grooves *b* and its upper end as provided with an annular rim or flange *b'*. In the upper end portion of the case C is journaled a pinion D.

E designates a weight, here shown as tapered and inclosing the case C. The inner surface of this weight E is circumferentially grooved; but it may be internally screwthreaded. When the weight E is about the case C, the pinion D gears into the grooves upon the inner surface of the weight, or the screw-thread thereof, if the same shall be screw-threaded.

F designates a follower, preferably made of some light material, so as to have slight centrifugal force. Externally this follower is circumferentially grooved, as shown; or it may be screw-threaded. The follower extends into the case C and bears against the outer end of the stick of lubricating material C'. The pinion D gears into the grooves upon the follower F, or into the screw-thread thereof, if the same should be screw-threaded. When the pulley A is rotated, the weight E will be thrown outwardly by centrifugal force. This will cause the rotation of the pinion D so as to force inwardly the follower F, whereby the latter will be caused to feed the stick of lubricating material constantly into contact with the shaft B.

I have shown a stop *c*, consisting of a spring secured to the exterior of the case C near one end, and having its other end bent so as to extend into the grooves upon the interior of the weight E. This stop, while permitting the outward movement of the weight E, will operate to prevent its inward movement. The rim or flange *b'* upon the case C operates also as a stop to prevent the weight E from being wholly moved off from the lubricator. A pin or projection *d*, shown as a screw, extends through the weight E and into one of the grooves *b*, which, when the weight E has been moved outwardly far enough, will come in contact with the rim or flange *b'* to effect the above result. The interior of the weight E, as also the exterior of the follower F, constitute, in effect, racks, which engage with the pinion D.

It will be observed that by my improvement a very positive feeding inward of the stick of lubricating material is effected through the agency of centrifugal force alone.

What I claim as my invention, and desire to secure by Letters Patent, is—

1. In a lubricator for loose pulleys, the combination, with a case in which is contained a stick of lubricating material, of a weight surrounding said case and provided internally with a rack, a pinion on said case engaging said rack, and a follower bearing upon said stick of lubricating material and provided with a rack also engaging said pinion, substantially as specified.

2. In a lubricator for loose pulleys, the combination, with a case for containing a stick of lubricating material, of a weight surrounding said case and provided internally with a rack, a pinion on said case engaging said rack, a follower provided with a rack also engaging said pinion, and a stop on said case for engaging the rack on the weight, substantially as specified.

3. In a lubricator for loose pulleys, the combination, with a case for containing a stick of lubricating material, of a weight surrounding said case and provided internally with a rack, a pinion on said case engaging said rack, a follower also provided with a rack engaging said pinion, a stop on said case, and a pin or projection on said weight adapted to contact with said stop to prevent a too extended outward movement of said weight, substantially as specified.

WILLIAM J. FAUL.

Witnesses:
FREDK. HAYNES,
ARTHUR H. GAMBLIN.